United States Patent
Alfier et al.

(10) Patent No.: US 12,276,402 B2
(45) Date of Patent: Apr. 15, 2025

(54) METHOD OF DETECTING LIGHT BEAMS, CORRESPONDING LIGHTING SYSTEM AND COMPUTER PROGRAM PRODUCT

(71) Applicants: OSRAM GmbH, Munich (DE); CLAY PAKY S.p.A., Bergamo (IT)

(72) Inventors: Alberto Alfier, Treviso (IT); Massimo Callegari, Bergamo (IT)

(73) Assignee: Clay Paky S.r.L., Seriate (IT)

( * ) Notice: Subject to any disclaimer, the term of this patent is extended or adjusted under 35 U.S.C. 154(b) by 503 days.

(21) Appl. No.: 17/737,752

(22) Filed: May 5, 2022

(65) Prior Publication Data

US 2022/0357019 A1 Nov. 10, 2022

(30) Foreign Application Priority Data

May 6, 2021 (IT) ........................ 102021000011672

(51) Int. Cl.
*F21V 14/02* (2006.01)
*F21V 23/04* (2006.01)
(Continued)

(52) U.S. Cl.
CPC .......... *F21V 14/02* (2013.01); *F21V 23/0478* (2013.01); *G06T 7/13* (2017.01);
(Continued)

(58) Field of Classification Search
CPC ........ F21V 14/02; F21V 23/0478; G06T 7/13; G06T 7/70; G06T 2207/10028; G06V 10/48; F21W 2131/406
See application file for complete search history.

(56) References Cited

U.S. PATENT DOCUMENTS 3,069,654 A 12/1962 Hough
8,104,899 B2 * 1/2012 Ha ........................ G03B 21/145
353/30
(Continued)

FOREIGN PATENT DOCUMENTS

EP 3 691 417 A1 8/2020
WO 2004/055776 A1 7/2004
WO 2012/051715 A1 4/2012

OTHER PUBLICATIONS

Search Report and Written Opinion dated Jan. 26, 2022, of priority Italian Application No. 102021000011672.
(Continued)

*Primary Examiner* — Shefali D Goradia
(74) *Attorney, Agent, or Firm* — DLA Piper LLP (US)

(57) ABSTRACT

A computer-vision system is equipped with a first camera and a second camera spaced apart from each other and enables acquisition of a first image and a second image of a light beam that propagates from a light-beam source towards a target position of the light beam. The first image and the second image of the beam differ from each other as a result of the first camera and the second camera being spaced apart from each other. The system produces a disparity map of the first image and second image of the beam to be projected in a three-dimensional point cloud starting from the disparity map according to point-cloud-projection calibration data that set in relation disparity maps for reference images with respective three-dimensional point clouds.

17 Claims, 5 Drawing Sheets

(51) Int. Cl.
  *G06T 7/13*   (2017.01)
  *G06T 7/70*   (2017.01)
  *G06V 10/48*  (2022.01)
  *F21W 131/406* (2006.01)

(52) U.S. Cl.
  CPC ................ *G06T 7/70* (2017.01); *G06V 10/48* (2022.01); *F21W 2131/406* (2013.01); *G06T 2207/10028* (2013.01)

(56) References Cited

U.S. PATENT DOCUMENTS

| | | | |
|---|---|---|---|
| 9,677,755 B1 | 6/2017 | Linnell et al. | |
| 2019/0266792 A1* | 8/2019 | Yao | G06T 7/55 |
| 2019/0332110 A1* | 10/2019 | Isele | G05D 1/0088 |
| 2022/0311987 A1* | 9/2022 | Balatzis | H04N 13/271 |

OTHER PUBLICATIONS

Canny, J., "A Computational Approach to Edge Detection," *IEEE Transactions on Pattern Analysis and Machine Intelligence*, 1986, vol. 8, No. 6, pp. 679-698.

Nakagawa, M., "Point Cloud Clustering Using Panoramic Layered Range Image," *Recent Applications in Data Clustering*, 2018, pp. 75-92.

\* cited by examiner

METHOD OF DETECTING LIGHT BEAMS, CORRESPONDING LIGHTING SYSTEM AND COMPUTER PROGRAM PRODUCT

TECHNICAL FIELD

This disclosure relates to detection of light beams such as use in the show-business and entertainment sector, for instance, in lighting systems (installations) used for the performance of shows such as concerts and the like.

BACKGROUND

In such a context of application (to which reference will be repeatedly made in what follows by way of example, without this implying any limit to the sphere of protection) it may happen that the location of various elements of a show (for example, in a concert, positions of singers and musicians on the stage) envisaged in an initial project or program will not find an effective correspondence in the final staging of the scene that is to be lit up.

Such a project can be defined by a light designer using tools that operate in three dimensions such as, for example, the product known by the brand name of Vectorworks or some other tool of the WYSIWYG type, identifying corresponding positions of orientation (pan and tilt) of the various lighting sources and storing them in the framework of a project defined for a given show.

When the lighting system is effectively installed in situ, the elements to be located on the scene that is lit up (for example, singers, musicians and their instruments) may—for various reasons—come to occupy positions different from the ones envisaged. Also, the lighting sources may be mounted—once again for various reasons—in positions that do not correspond to the ones originally envisaged at the design level.

Such a situation is schematically represented in FIGS. 1A and 1B.

FIG. 1A refers to a target position L to be occupied, for example, by a singer or another artist to be lit up by a series of lighting sources or fixtures F1, . . . , Fn that should light it up, causing the respective light beams to converge thereon.

The situation that may arise in actual fact may correspond to the one represented in FIG. 1B, where:
the target position to be lit up (designated by L in FIG. 1A) occupies a location (designated by L' in FIG. 1B) that is at least slightly shifted with respect to the position L originally envisaged; and the position of installation of one or more of the lighting sources or fixtures is changed with respect to what was initially envisaged, as schematically represented by F2' and Fn' in FIG. 1B.

As a result, the light beams do not illuminate as desired the portion or portions of scene to be lit up and may even get lost in an undesirable way outside the scene, ending up, for example, on the audience or on areas that are not to be lit up.

A remedy to a situation like the one illustrated in FIG. 1B may be sought by an action of adjustment (or calibration) performed in a totally manual way by operators who intervene on the mounting positions of the fixtures F1, . . . , Fn to modify the location and/or orientation of the sources and restore the condition of convergence thereof on the area L to be lit up.

It is evidently an operation that is rather complicated to perform and is liable to use up precious time, above all if implemented just before the start of the show.

For the above reason, it is possible to think of providing the console that controls a lighting system as represented in FIGS. 1A and 1B with an automatic-correction function that can enable an operator to modify to a substantially fixed extent the orientation (pan/tilt) as a whole of the light sources or fixtures F1, . . . , Fn practically throughout the show.

This is a solution that is on the whole somewhat rigid and, above all, a solution that is unable to remedy installation "defects" (meaning offsets between the situation envisaged at the design level and the situation effectively implemented), which may arise in a wide range of possible situations.

SUMMARY

We thus provide a lighting system, and
a corresponding computer program product comprising software code portions that, when loaded into a device that controls a lighting system, can cause the system to operate with our method.

We thus also provide computer-vision techniques. This affords the possibility, in a context of lighting techniques, of benefiting from the characteristics of DMX (Digital MultipleX) systems—or more precisely DMX512 systems—DMX being a well-known standard used to control stage lighting in the show-business sector, for example, at the RDM layer (where RDM stands for Remote Device Management and is a communication protocol based upon DMX for bidirectional communication between a light console and a lighting source).

We further provide a system of cameras for stereoscopic vision able to detect a light beam emitted by a single lighting source, performing an action of adjustment towards a desired position that can be carried out in an altogether automated way in times shorter than those required by a human operator.

LIST OF REFERENCE SIGNS

Figure 1A:
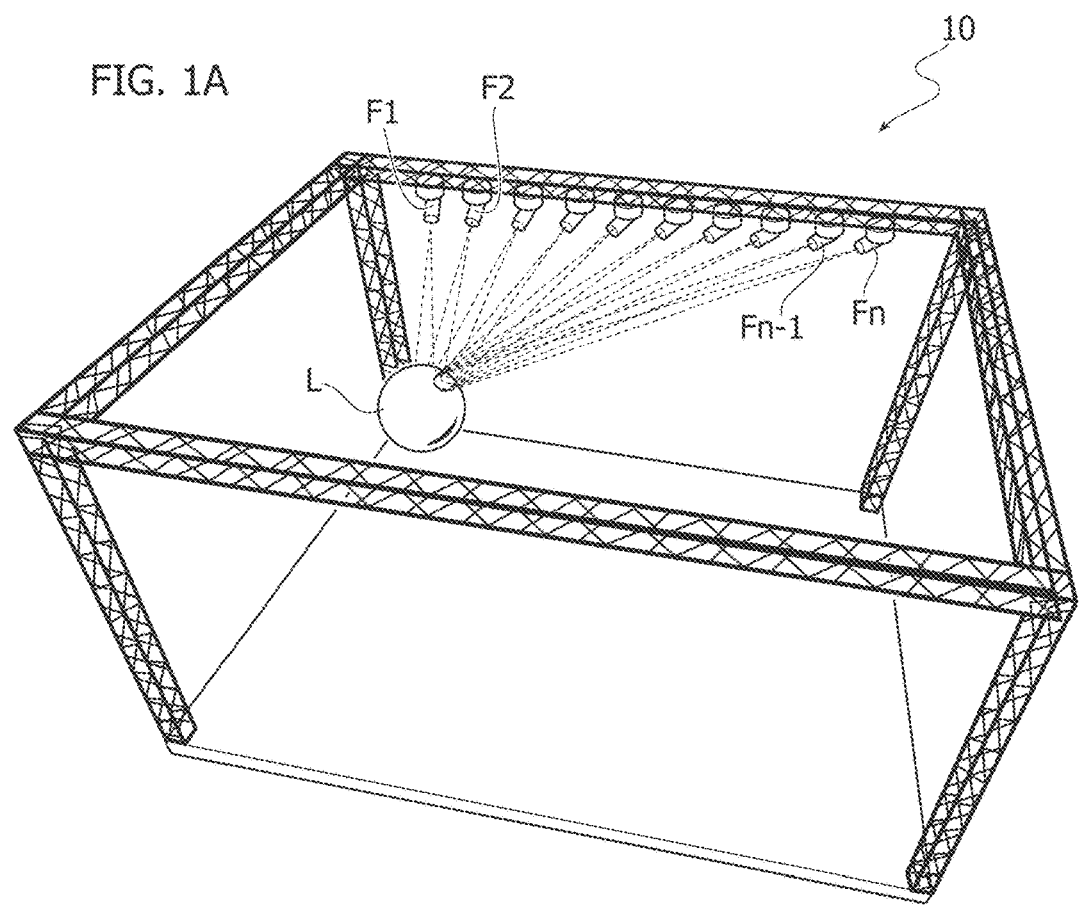
FIGS. 1A and 1B schematically show a known system.

10 Lighting system
12 Controller (console)
14 Computer-vision system
16 Gateway
C1 First camera
C2 Second camera
d Distance
ImgL First image
ImgR Second image F1, . . . , Fn Light-beam sources
L, L' Target position of the light beam
DM Disparity map
CC Calibration data
EXC Reference images
R Geometrical line (straight line or segment)
100 Location of first target position L'
102 Detection of offset of second target position L
104 Adjustment of source as a function of offset
200 Image acquisition
202 Contrast enhancement/thresholding
204 Edge/line search
206 Point-cloud projection
208 Clustering of cloud points
210 Generation of straight line between source and target

DETAILED DESCRIPTION

In the ensuing description, various specific details are illustrated to enable an in-depth understanding of various examples according to this disclosure. The examples may be obtained without one or more of the specific details, or with other methods, components, materials and the like. In other examples, known structures, materials, or operations are not illustrated or described in detail so that the various aspects of the examples will not be obscured.

Reference to "an example" or "one example" in the framework of this disclosure is intended to indicate that a particular configuration, structure, or characteristic described in relation to the example is comprised in at least one example. Hence, phrases such as "in an example" or "in one example" that may be present in various points do not necessarily refer exactly to one and the same example. Moreover, particular conformations, structures, or characteristics may be combined in any adequate way in one or more examples.

The reference numbers used herein are provided merely for convenience and hence do not define the sphere of protection or the scope of the examples.

It will be appreciated that—unless the context indicates otherwise—parts or elements that are similar are designated in the various figures by the same reference numbers, and for brevity the description is not repeated for each figure.

Figure 2:
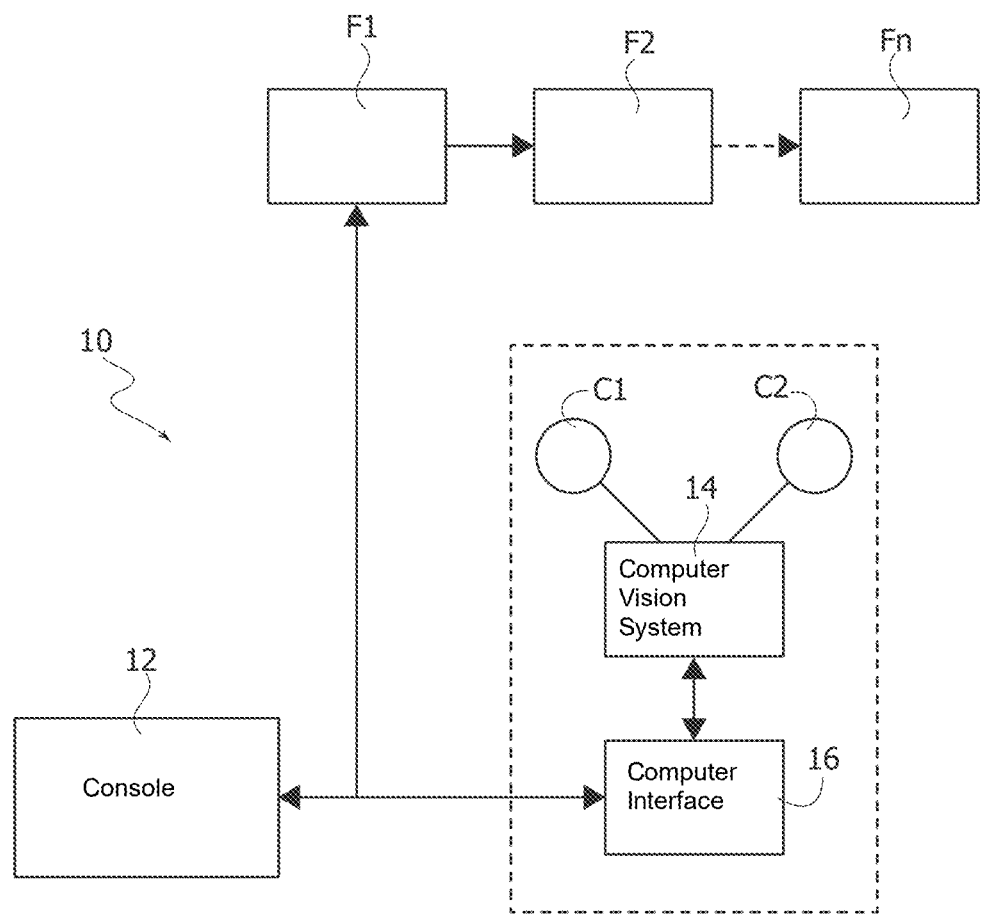
FIG. 2 is a general block diagram of a lighting system of an example of our lighting system.

FIG. 2 shows a block diagram of a lighting system or installation 10.

Figure 1B:
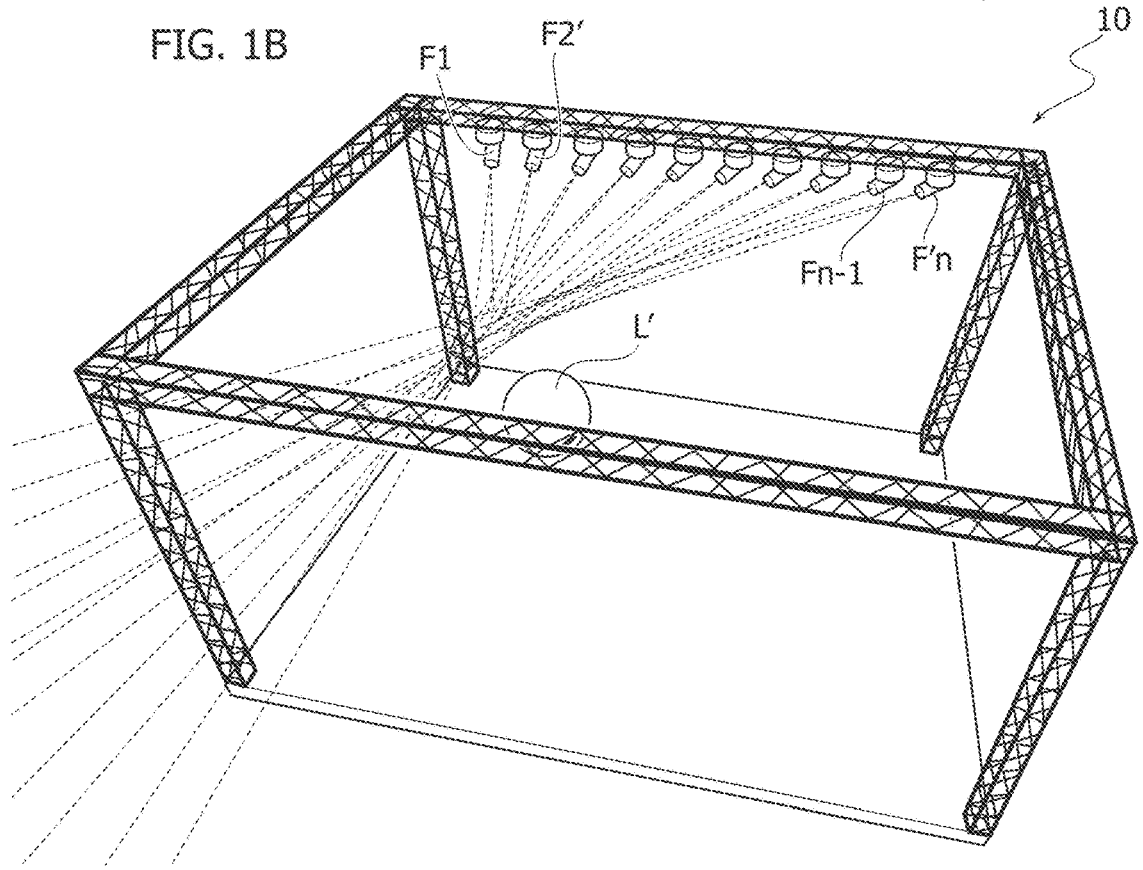

This may, by way of example, be a lighting system that can be used in the show-business and entertainment sector such as a lighting system that is to be used for a musical show such as a concert (in this regard, useful reference may be made to what has already been said previously with reference to FIGS. 1A and 1B).

Such a system 10 comprises a certain number of controlled lighting sources or fixtures F1, F2, . . . , Fn, the operating parameters of which (switching-on/switching-off, intensity of the light beam emitted, movements of pan & tilt, chromatic characteristics of the radiation emitted and the like) are controlled via a console 12.

Systems of this nature are known in a wide range of solutions of implementation, which makes it unnecessary to provide a more detailed description herein.

It will be appreciated in particular that the examples chiefly regard the modalities for detecting the position in space (i.e., in three dimensions) of the light beams emitted by the sources F1, . . . , Fn to be able to achieve (automatically) a desired orientation.

The foregoing is irrespective of the specific modalities (switching-on/switching-off, intensity of the light beam emitted, movements of pan and tilt, chromatic characteristics of the radiation emitted and the like) implemented in driving the sources of light radiation.

One or more examples may, indeed, be considered altogether "transparent" in regard to the aforesaid driving modalities.

Once again, as has already repeatedly been said, reference to lighting systems, for example, lighting systems that are to be used in the show-business sector and/or entertainment sector is not to be understood as in any way limiting the examples.

The modalities for detecting the position in (three-dimensional) space of the beams of light emitted by the sources F1, . . . , Fn as described herein may in fact be applied also to different contexts of use, for example, to detect the position in the space of beams of light emitted by sources mounted on board vehicles.

One or more examples envisage recourse to a (stereoscopic) computer-vision system 14 equipped, for example, with two cameras C1 and C2.

The cameras C1, C2 are able to provide, through their output signals, combined with one another, a stereoscopic vision of the environment (for example, of the scene lit up).

A system 14 of this nature is consequently capable of detecting the location of one or more elements (objects and/or people) arranged in a scene that are to be lit up (see, for example, the target position designated by L in FIG. 1A) by light beams emitted by the sources F1, F2, . . . , Fn.

By way of example, such a system is capable of detecting the position occupied on a stage (scene) by a certain instrument (consider, for example, a drum set or to an electronic keyboard) and verifying whether this position is shifted with respect to the one originally envisaged at the lighting-design level. Added to this is likewise the capability of detecting the degree of the offset, making it possible to intervene on the orientation of the sources or fixtures F1, . . . , Fn to achieve a desired lighting condition (FIG. 1A) by remedying a defective or unsatisfactory lighting situation (FIG. 1B).

One or more examples may also involve recourse to a larger number of cameras (for example, three or more cameras), with the possibility of obtaining a greater amount of information on the surrounding environment.

For brevity and simplicity of illustration, the following description will refer to just two cameras C1 and C2.

For the same reason, to not overburden the description, the following disclosure will be regardless of the possible presence, in a computer-vision system 14, as exemplified herein, of further characteristics such as:
the use of a QR code to identify rapidly a position visible to the cameras; and/or the possibility of using LiDAR technology to map the scene lit up and detect the positions of the sources of light radiation in the environment; and/or
the use of motorized arms or drones to adjust the point of observation of the vision system, i.e., the distance between the cameras C1, C2, and encompass a wider area according to semi-automatic operating modes.

The block diagram of FIG. 2 exemplifies the possibility, for the computer-vision system 14 coming under which are the cameras C1, C2, of interacting with the console 12 via a communication interface 16 that may be constituted by a so-called DMX/RDM gateway.

Also in this example, it is a matter of characteristics/features of a type in itself known such as to render a more detailed description herein superfluous.

Figure 3:
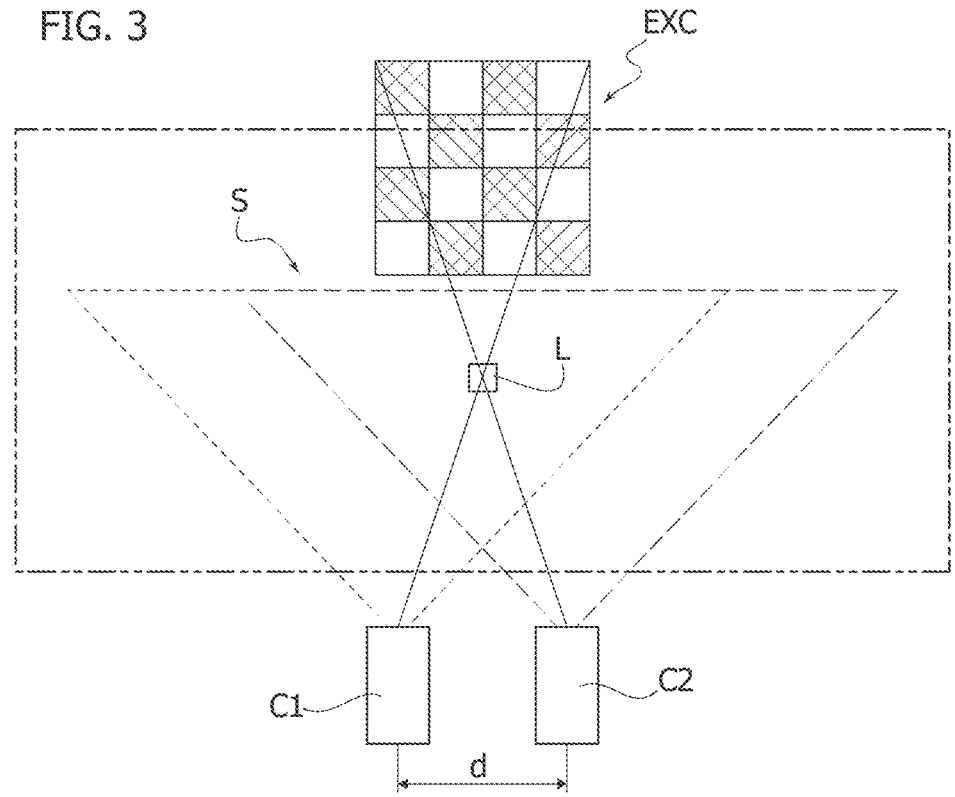
FIG. 3 is a diagram illustrating principles underlying our systems and methods.

The diagram of FIG. 3 exemplifies (in what may be considered as an ideal top plan view of a scene or stage S) the possibility for two cameras such as C1 and C2 arranged at a distance d from one another to locate an object or a position L in the range of the scene S lit up and likewise determining (by operating with the modalities described in what follows) the orientation in space of one or more light beams that propagate from a light-beam source F1, F2, . . . , Fn towards a target position of the light beam (see the positions L and L' in FIGS. 1A and 1B).

This is in particular obtained by representing each of the aforesaid beams in the form of a geometrical (straight) line, i.e., as a set of spatial co-ordinates X-Y-Z of the points of a straight line that goes from the source (or fixture) towards a target position. A straight line (segment) of this nature, designated by R, is represented, with reference to the light beam projected by the source or fixture Fn, in the right-hand part of FIG. 5, described below. This representation is in line with the use, current in physical science, of identifying with a line the path of a ray of light.

The overall effect used herein amounts to a stereoscopic view in which one and the same object or position, observed from two different viewing angles, can be used for the purposes of a three-dimensional reconstruction.

In a context as illustrated herein, it has proven advantageous to use cameras for use in the industrial context with a resolution of 1.6 M pixels located at a distance d in the 50-to-70-cm range with a focal length of 6 mm and with each camera having a field of view in the 32°-to −44° range (vertical-horizontal).

For instance, they may be cameras commercially available under the brand name of MVBlueFox-3-2016G-1112 provided with 6-mm Kowa optics.

Of course, the above data are merely provided for reference and are mentioned without any intention of limiting the examples.

For the present purpose, a computer-vision system such as the system 14 lends itself to performing, using reference images such as checkerboards (denoted by EXC in FIG. 3), a calibration procedure in which the images acquired via the first camera C1 and via the second camera C2 are processed to generate a map of so-called disparity (a concept to which we shall return in what follows) between the two images, then correlating the aforesaid map with a set or cloud of geometrical points that represent the reference images (in three-dimensional space X-Y-Z).

The aforesaid correlation data obtained during calibration are dictated merely by the geometry of the stereoscopic-vision system (cameras C1 and C2), thus proving invariant with respect to the images detected.

The above correlation/calibration data thus enables, starting from a disparity map obtained from two images of one and the same object acquired from two different points (for example, via the cameras C1 and C2), projection of the aforesaid map in a cloud of points that represent (in three-dimensional space X-Y-Z) the object represented by the two images. This is obtained irrespective of the object represented, given that the aforesaid correlation/calibration data are linked together only by the geometry of the stereoscopic vision system (cameras C1 and C2), thus being invariant with respect to the images detected.

To return to the discussion made in relation to FIGS. 1A and 1B, a lighting system 10 as illustrated in FIG. 2 comprises lighting sources F1, F2, . . . , Fn, each configured to produce a light beam that propagates from a light-beam source (precisely, F1, F2, . . . , Fn) towards a target position of the light beam (for example, L, L'). In addition to being provided with a function of remote control of the sources F1, F2, . . . , Fn starting from the console 12 (which is of a type in itself known, in particular as regards the orientation of the sources F1, F2, . . . , Fn and of the beams generated thereby), the system 10 is equipped with a computer-vision system 14 provided (at least) with a first camera C1 and a second camera C2, the first camera C1 and the second camera C2 being spaced apart from each other by a distance d, which, for simplicity, may be assumed as being in the horizontal direction.

Figure 4:
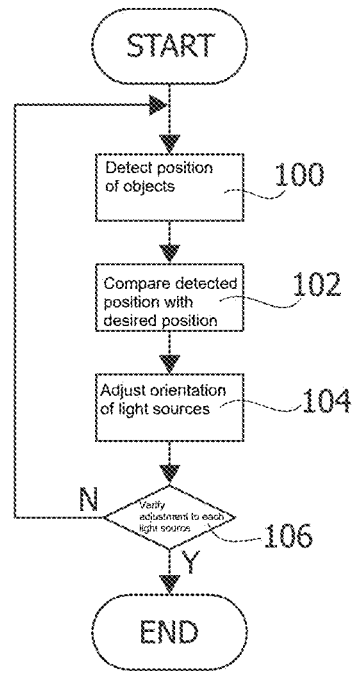
FIG. 4 is a flowchart providing an example of possible modes of operation of a system, as exemplified in FIG. 2.

Such a system lends itself to implementation of an adjustment procedure as schematically represented in the flowchart of FIG. 4.

After start START, in a step designated by 100, processing functions that may for simplicity be assumed as being located in the vision system 14, detect the position of the objects/positions in the scene to be lit up, likewise detecting—according to the modalities illustrated in detail in the following description—the position of each individual light beam coming from one of the light sources F1, F2, . . . , Fn.

In a step exemplified by block 102, processing functions that can be assumed for simplicity as being implemented in the console 12 compare the "actual" positions detected (L' in FIG. 1B) with the positions "envisaged" or "desired" (L in FIG. 1A) that are basic to a given lighting project, obtaining corresponding offset data, i.e., how much the actual position, i.e., L', is shifted with respect to the design position, i.e., L.

In a step (or set of steps) exemplified by block 104, processing functions that once again may be considered as being implemented in the console 12, carry out, as a function of the offset data detected previously, interventions of adjustment of the orientation of the light sources or fixtures F1, F2, . . . , Fn that are such as to cause the light beams to be effectively aimed at the desired object or target position.

The verification step designated by 106 in the flowchart of FIG. 4 exemplifies the fact that these actions can be performed individually for each of the lighting sources or fixtures F1, . . . , Fn.

A negative outcome (N) from step 106 identifies the fact that the action of adjustment has not yet been completed on all the sources F1, . . . , Fn.

A positive outcome (Y) from step 106 indicates, instead, the fact that the aforesaid operation of adjustment has been performed on all the sources or fixtures so that the desired action of adjustment can be considered concluded (END).

The actions or steps exemplified by blocks 102 and 104 can be performed according to criteria known to persons skilled in the art, since they basically amount to the solution of a problem of solid geometry, aimed at causing the individual light source F1, . . . , Fn to be oriented (in pan and tilt) such that the beam generated thereby will be directed in the desired way towards a given position L of the scene S.

The solution to the above problem presupposes, in addition to the knowledge of the co-ordinates (in space) of positions such as L and L', the knowledge of the actual location (in space) of the beams generated by the light sources F1, . . . , Fn.

As has been seen (FIG. 1B), for one or more of the sources or fixtures the aforesaid actual location may not be the desired one, for example, in so far as the source has been mounted in a position at least in part different from the one envisaged during design of the lights.

The primary purpose of one or more examples is to acquire the knowledge of the actual location (in space) of the beams generated by the sources F1, . . . , Fn.

Figure 5:
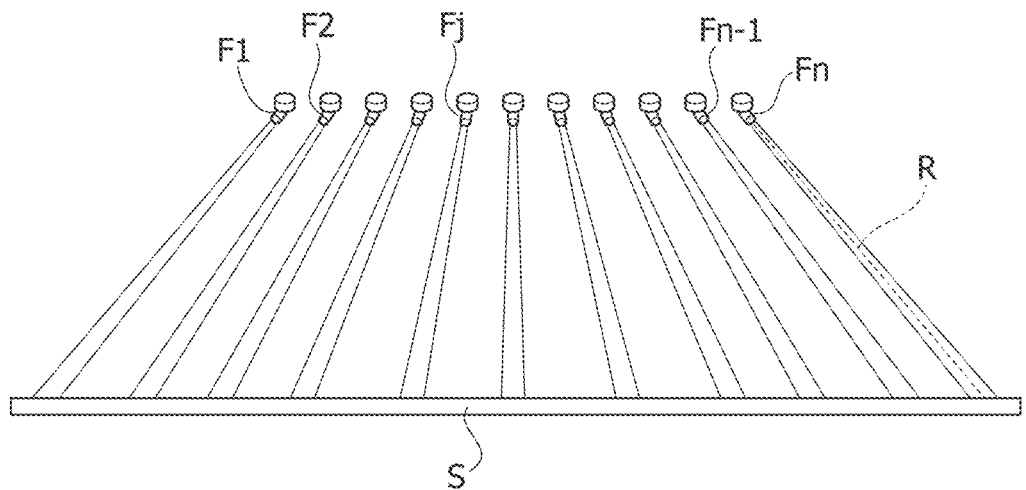
FIG. 5 illustrates a possible stage-lighting solution.

FIG. 5 represents a scene S (for example, a stage prearranged for performance of an event such as a concert) lit up via a series of light beams coming from sources or fixtures F1, F2, . . . , Fj, Fn−1, Fn.

Purely by way of example, light beams are here represented that are assumed as coming from above originating from the rear side of the scene S. However, what will be said in what follows identically applies to light beams with an orientation of a different type, for example, vertical light beams that come from zenithal positions with respect to the scene S.

Figure 6:
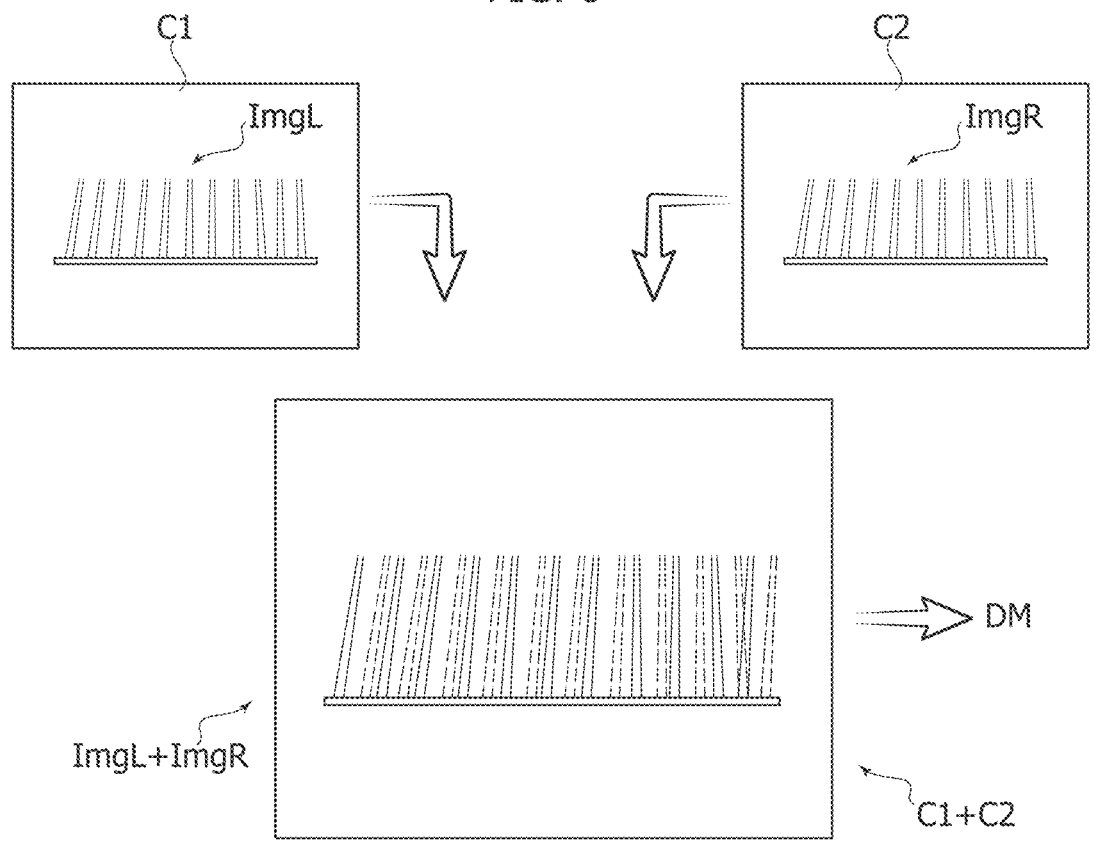
FIG. 6 illustrates possible modes of use of images of light beams as illustrated in FIG. 5 detected by cameras of our computer-vision system.

FIG. 6 exemplifies images of lighting patterns like the one exemplified in FIG. 5 detected via two cameras C1 and C2 located at a certain distance from one another (assumed for simplicity to be in the horizontal direction: see d in FIG. 3).

For instance, the image ImgL at the top left in FIG. 6 may be viewed as exemplifying the image coming from a camera C1 on the left of the scene, whereas the image ImgR at the top right may be viewed as exemplifying the image coming from a camera C2 on the right of the scene.

The two images ImgL and ImgR (assumed to be done with digitalized images, as is common in computer-vision systems) can be combined with one another.

The result of the combination is represented schematically at the bottom of FIG. 6, where the pattern of the image ImgL is once again represented with a solid line, whereas the pattern of the image ImgR is represented with a dashed line: this representation aims at highlighting the fact that, given that the images ImgL and ImgR are acquired by cameras located in different points, they are likewise different from one another.

Figure 7:
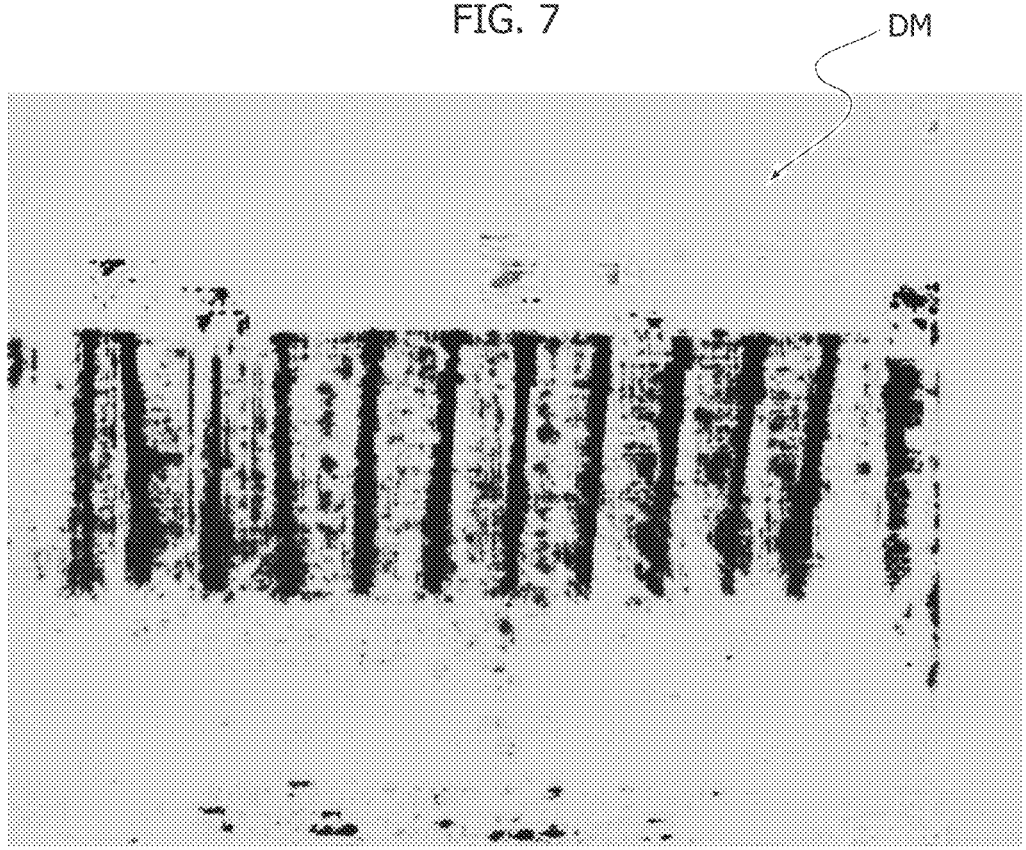
FIG. 7 is a so-called disparity map that can be generated starting from representations of the same type as the ones illustrated in FIG. 6.

In particular, it is possible to obtain from the two images ImgL and ImgR coming from the cameras C1 and C2 a so-called disparity map (DM) such as the one represented schematically with the intrinsic limitations of a line drawing in FIG. 7.

Such a disparity map DM contains information on the difference or apparent movement between a pair of stereoscopic-vision images and hence contains—conveyed by the offset between the two patterns—also a "three-dimensional" indication of the distance at which the individual beams are located as a function of the calibration of the cameras.

This fact corresponds to what can be experienced by alternately opening and closing one's eyes. If, in particular, this is done in rapid sequence, it may be noted that nearby objects (for which the disparity of the images that are formed in the two eyes is evident) appear to jump, shifting to one side, whereas more distant objects (for which the disparity of the images that are formed in the two eyes is less) practically do not move.

Likewise, there have been known for a long time binocular viewers that give the observer the sensation of perceiving also the depth of the image observed (stereoscopic image) using two photographs that are slightly different from one another—hence with a certain disparity.

To return to what has already been said previously with reference to FIG. 3, in a stereoscopic-vision system (for example, with two cameras C1 and C2) it is possible to carry out—in a way in itself known—operations of calibration conducted on sample images (for example, checkerboards EXC), storing (see CC in FIG. 8) relations between the disparity map DM and the distance of the points of the image observed with respect to the plane of observation (the one in which the cameras are located).

As has been said, the above relations (albeit problematical to express in analytical form) are—all other things being equal—of a purely geometrical nature, consequently being invariant with respect to the images observed.

In one or more examples, the computer-vision system 14 is hence able to determine the information on the spatial location and direction of each beam (information that identifies, among other things, the position of mounting of the corresponding light source or fixture) useful for obtaining the desired adjustment of lighting in the terms described with reference to the flowchart of FIG. 4.

The foregoing is based upon a mathematical approach as a possible alternative to a detection of a purely perceptive type, as could be performed by a human observer.

Figure 8:
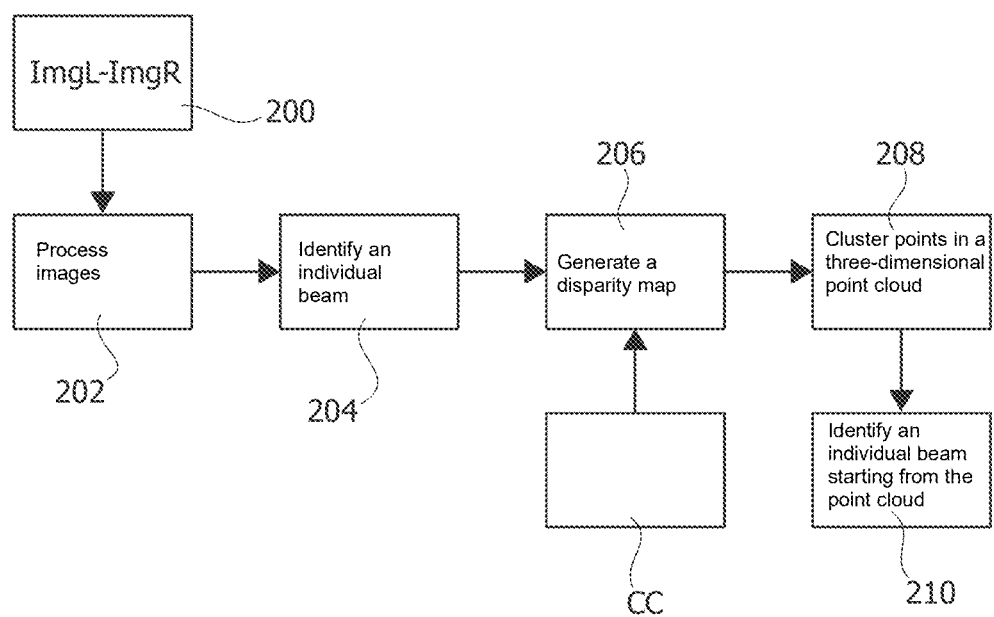
FIG. 8 is a flowchart providing an example of the conduct of various processing operations in our systems and methods.

Operating according to the modalities exemplified in the flowchart of FIG. 8, in a step 200 a processing function (that can be assumed as being implemented—according to criteria in themselves known—in the vision system 14) detects the images of the light beams produced by the cameras, i.e., ImgL (camera C1) and ImgR (camera C2).

The two images ImgL and ImgR can be advantageously subjected (in a way in itself known) to various processing operations (block 202) such as an improvement (enhancement) of contrast and a thresholding aiming at giving rise to clearer images.

Block 204 identifies a step of identification of the individual beam, which may comprise, for example, an operation of edge search on the image, followed by an operation of detection of the lines corresponding to the various beams.

Operations like the ones exemplified by block 204 may be performed according to criteria known to persons skilled in the art.

For instance:
for edge search, it is possible to resort to the technique known as the Canny algorithm, described in Canny, J., A Computational Approach To Edge Detection, IEEE Transactions on Pattern Analysis and Machine Intelligence, 8(6): 679-698, 1986; and for line detection, it is instead possible to resort to the technique known as the Hough transform, described in U.S. Pat. No. 3,069,654 A— Method and means for recognizing complex patterns.

Block 206 in the diagram of FIG. 8 corresponds to the operation of generation of a disparity map, which is then projected in the form of a point cloud via 3D projection as a function of calibration data CC stored in the system 14 and corresponding to the (invariant) projection of the disparity maps obtained for sample images of reference configurations (for example, the checkerboards EXC of FIG. 3) in corresponding point clouds.

The above operation corresponds in practice to generating, for the (two-dimensional) lines that represent the beams of light in the images ImgL and ImgR a set or cloud of points in 3D space, in which a triad of co-ordinates X-Y-Z is made to correspond to each point, where: X-Y identifies the position of the individual point with respect to the set of the cameras C1, C2 (for example, at the central point of the distance d between the cameras C1 and C2 in FIG. 3); and Z is the distance of the individual point with respect to the cameras C1, C2, which for simplicity may be assumed as being arranged alongside in a vertical plane in front of the scene S, with the distance d detected in a horizontal direction.

This operation, which leads to mapping of two-dimensional information into three-dimensional information (including depth or distance Z), may consequently be carried out by: calculating the disparity map DM between the images ImgL (camera C1) and ImgR (camera C2)— advantageously processed in blocks 202 and 204 to achieve a better result; and exploiting calibration information CC obtained for the cameras C1 and C2 by referring to reference patterns like the checkerboards EXC of FIG. 3 for projecting the disparity map in a point cloud; as has been seen, this calibration information is invariant with respect to the images used to obtain it.

The techniques of generation of the disparity maps are certainly to be deemed known to the person skilled in the art.

Likewise known is the possibility of projecting a disparity map received in a 3D point cloud, using the projection parameters of cameras such as C1 and C2 to provide a size on a desired scale.

At this point a procedure (algorithm) as exemplified by block 208 in FIG. 8 is able to identify, for example, via a clustering technique, sets of points that may correspond to rectilinear configurations, like the ones of the light beams represented in FIG. 5.

Also in this example it is possible to resort to techniques in themselves known in the art, as exemplified, for example, in M. Nakagawa: "Point Cloud Clustering Using Panoramic Layered Range Image, Recent Applications in Data Clustering" Harun Pirim, IntechOpen, DOI: 10.5772/intechopen. 76407", Nov. 5, 2018.

Finally, the block designated by 210 in FIG. 8 corresponds to an operation of identification of the individual beams starting from the point cloud, in the form of straight lines (segments) such as the straight line R provided by way of example on the right in FIG. 5 with reference to the light beam generated by the source Fn.

This operation may be viewed as the ideal completion of the step designated by 100 in FIG. 4.

In brief, the operations exemplified in the flowchart of FIG. 8 envisage, in the first place (step 200), the operation of acquiring, via the computer-vision system 14 equipped with (at least) a first camera C1 and a second camera C2 spaced apart from each other (by a distance d—see FIG. 3):
a first image ImgL, and
a second image ImgR
of a light beam that propagates from a light-beam source F1, . . . , Fn towards a destination or target position of the light beam as may be a target position such as L or L' in FIGS. 1A and 1B.

The first image ImgL and the second image ImgR of the beam differ from each other as a result of the fact that the first camera C1 and the second camera C2 are spaced apart from one other so that they "see" the beam from two different positions (see, for example, FIG. 6).

It is hence possible to produce (in step 206, possibly after performing the operations of steps 202, 204—e.g., contrast enhancement, thresholding, edge search using the Canny method and/or line search using the Hough transform—which are able to enhance the final result) a disparity map DM of the first image ImgL and second image ImgR of the beam.

Such a map (see FIG. 7 as an example) lends itself to being projected in a three-dimensional point cloud, the points of which may then be clustered together (with a clustering function exemplified by block 208) to produce (block 210) a geometrical line (straight line or segment) that extends between the light-beam source (i.e., a respective fixture F1, Fn) and the target position of the light beam (e.g., L, L'): see the straight line R exemplified on the right in FIG. 5 with reference to the light beam generated by the source Fn.

To carry out the aforesaid projection of the disparity map in a point cloud it is possible to store in the computer-vision system 14 (invariant) point-cloud-projection calibration data (block CC in FIG. 8) that set in relation disparity maps obtained for reference images (for example, the checkerboards EXC of FIG. 3) acquired using the first camera C1 and the second camera C2 with respective three-dimensional point clouds.

The three-dimensional point cloud can then be projected starting from the disparity map DM as a function of the aforesaid point-cloud-projection calibration data CC stored in the computer-vision system 14.

As has been seen with particular reference to the flowchart of FIG. 4, a solution like the one described herein makes it possible to:
locate (in step 100) a first target position (for example, L' in FIG. 1B) of the light beam starting from the light-beam source F1, . . . , Fn as a function of the geometrical straight line that extends between the light-beam source and the first target position L' of the light beam;
compare (in step 102) the first target position L' with a second pre-set target position (for example, the desired position designated by L in FIG. 1A), detecting the offset between the first target position L' and the second target position L; and
adjust (in step 104) the orientation of the light beam that propagates from the light-beam source F1, F2, . . . , Fn each time considered as a function of the offset detected between the first target position L' and the second target position L.

As a result of the adjustment, the light beam propagates from the light-beam source (F1, Fn) towards the second target position L, which is the desired one, established at the lighting-design level.

Advantageously, by exploiting the accuracy of detection, the adjustment can be carried out in open loop: in practice, after detecting the offset (for example, at the level of DMX values), the controller 12 can carry out beam adjustment, without performing checks using further images: this mode of operation reduces the intervention times, assuming that the system is sufficiently accurate.

Once again, in one or more examples it is possible to consider using (for example, at the level of the controller 12) a graphic interface capable of selecting the beams seen by the cameras C1 and C2 and identifying the target position directly from the monitor of the aforesaid interface, for example, by indicating a target point or a straight line with respect to which to maintain parallelism.

The solution described herein may be applied to a lighting system 10, comprising a plurality of light-beam sources F1, . . . , Fn that produce respective light beams.

In this example, it is possible to activate the sources F1, . . . , Fn selectively during respective activation intervals so that, during the respective activation interval, one source F1, Fn is activated to produce a respective light beam, while the other sources are deactivated.

During the respective activation interval it is possible, for the light beam produced by the source activated during the operations represented in the flowchart of FIG. 8, to produce a geometrical line that extends between the source currently activated and the target position of the light beam L, L'.

Above all in the example of narrow (i.e., only slightly divergent) beams, a given line identified starting from the images ImgL and ImgR may correspond, for example, either to a beam projected from above downwards starting from the back of the scene or to a beam projected from below upwards starting from the front of the scene.

The step of identification of the individual beams may consequently involve also an operation of slight variation of values of pan and/or tilt of the individual beam (which can be implemented via the console 12), aimed at eliminating any possible ambiguities in identification of the direction of propagation of the light of the beam.

In particular, it is possible to impose on each source F1, . . . , Fn an (even extremely contained) variation of orientation and identify:

a first end of the geometrical line between the light-beam source and the target position of the light beam that is subject to displacement in response to the above variation of orientation; and a second end of the aforesaid geometrical line that is not subject to displacement in response to the above variation of orientation.

The first end and the second end thus identified correspond, respectively, to the location of the target position of the light beam (that "sweeps" the scene as a result of a variation, even a modest one, in the orientation of the beam) and to the location of the light-beam source F1, Fn, which, even though it undergoes a (slight) movement of orientation, remains substantially stationary with respect to the aforesaid geometrical line.

The aforesaid slight variation of values of pan and tilt of the individual beam makes it possible to distinguish the source or origin end of the beam (which practically does not move as a result of the slight variation of pan and/or tilt) from the target end of the beam (which as a result of the slight variation of pan and/or tilt "sweeps" the scene S for a narrow angle). In general, the end of the straight line (segment) R that varies less is the source end.

In general terms, at times a light beam may not be visible in its completeness (i.e., from the source to the position lit up). In one or more examples, the straight line or segment R may be "completed" by extrapolation, also as regards the position of the source.

We found that the operating mode described with reference to FIG. 8 enables highly precise estimation of orientation of a beam of a lighting system as considered herein with reduced margins of error.

For instance, a value of inclination of a beam measured to be equal to 68.6° may be estimated as being of 70.2°. This corresponds, at the level of distance, to a difference between the measured distance and the estimated distance in the region of, for example, 25 cm. It is thus possible to make precise estimates of distance with a value of precision (understood as deviation from the actual value) of less than 3%, with typical values in the region of 1-2%.

As the distance d between the cameras C1, C2 increases, the disparity between images such as the images ImgL and ImgR increases, with a consequent better capacity of assessing the distance or depth (co-ordinate Z of the point cloud generated in step 206).

The environmental light can affect the result at the level of disparity map DM in so far as the presence of ambient light generates "noise", thus reducing the signal-to-noise ratio of the disparity map.

It may hence be advantageous to envisage that the system described herein can operate with reduced ambient light, for example, after prior deactivation of background lighting sources while the operation of adjustment described is being carried out.

Likewise, in the presence of a number of lighting sources, it is possible to envisage deactivating all the sources except the ones currently undergoing adjustment.

A solution as described here proves robust in regard to perturbing phenomena such as a cloud of smoke of a special effect that passes in front of a given stretch of the beam with the signal produced by the camera that increases only in the stretch concerned without saturating in the rest of the straight line (segment) R. In this example, it is possible to think of detecting two images, one with a short integration time such as not to saturate the stretch concerned, and one with a longer integration time in which there is saturation in the stretch concerned, keeping on the camera a signal that is sufficiently high on the rest of the straight line (segment) R.

One or more examples have proven effective also in the presence of light beams that cross one another and/or also at rather long distances (for example, with the cameras C1, C2 located at 50 m from the scene S that is lit up).

One or more examples may benefit from the use of cameras with high resolution (for example, 3 Mpixels) with an increase of the focal length (for example, f=12°) at the expense of a reduction in the field of view (for example, from 40° to 20°).

A solution as described here is able to provide an effective compensation of the aberrations of the lenses of the cameras, this also in relation to the capacity of "capturing" stereoscopic images, giving rise a point cloud in which it is possible to track vectors of the rays on the basis of an analysis of the above point cloud.

This facilitates detection of the location and orientation of an orientable source of light radiation or fixture, it thus being possible to aim the corresponding beam automatically so that it corresponds to a reference beam for the type of scene.

One or more examples may envisage (for example, via the gateway 16) a feedback mechanism that is able to read/modify in real time the DMX values of the console 12 by sending thereto information to enable an adequate correction.

The aforesaid steps (in particular with reference to the flowchart of FIG. 8) of producing the disparity map DM of the first image ImgL and second image ImgR of the beam, projecting the three-dimensional point cloud, and clustering the points in the three-dimensional point cloud to produce the aforesaid geometrical line between the source and the target of the beam lend themselves to being implemented at a software level via code loaded into a computer-vision system 14 equipped with a first camera C1 and a second camera C2 spaced apart from each other, with the computer-vision system configured for acquiring, via the first camera C1 and the second camera C2, a first image ImgL and a second image ImgR of a light beam that propagates from a light-beam source F1, F2, . . . , Fn with the above code, which, executed in the computer-vision system 14, causes the computer-vision system 14 to carry out the aforesaid operations according to the method described herein.

Likewise, the steps described herein, in particular with reference to the flowchart of FIG. 4, of locating (step 100) a first target position L' of the light beam, comparing (step 102) the first target position L' and the second, pre-set, target position L, and adjusting (step 104) the orientation of the light beam that propagates from the light-beam source as a function of the offset that has been determined, lend themselves to being implemented at a software level via a code loaded into a controller 12 of the light-beam source, coupled (for example, via the gateway 16) to the aforesaid computer-vision system 14, causing the controller to execute the aforesaid steps.

Without prejudice to the underlying principles, the details of construction and the examples may vary, even significantly, with respect to what has been described herein purely by way of non-limiting example, without thereby departing from the sphere of protection, as specified in the appended claims.

What is claimed is:

1. A method comprising:
    acquiring via a computer-vision system equipped with a first camera and a second camera spaced apart from each other, a first image and a second image of a light beam that propagates from a light-beam source towards a target position of the light beam, wherein the first image and the second image of the light beam differ from each other as a result of the first camera and the second camera being spaced apart from each other, producing a disparity map of said first image and said second image of the beam, projecting a three-dimensional point cloud starting from said disparity map of said first image and said second image of the beam, clustering the points in said three-dimensional point cloud to produce a geometric line that extends between said light-beam source and said target position of the light beam, applying a variation of orientation on said light-beam source, and identifying a first end of said geometric line between said light-beam source and said target position of the light beam subject to displacement in response to said variation of orientation and a second end of said geometric line between said light-beam source and said target position of the light beam exempt from displacement in response to said variation of orientation, wherein said first end and said second end identify, with respect to said geometric line, the location of said target position of the light beam and the location of said light-beam source, respectively.

2. The method of claim 1, further comprising:

storing in the computer-vision system point cloud projection calibration data that relates disparity maps for reference images acquired through said first camera and said second camera with respective three-dimensional point clouds, and projecting said three-dimensional point cloud starting from said disparity map of said first image and said second image of the beam as a function of said point cloud projection calibration data stored in the computer vision system.

3. The method of claim 1, further comprising applying to said first image and to said second image of the beam, before producing said disparity map, processing comprising at least one of contrast enhancement and thresholding.

4. The method of claim 1, further comprising applying to said first image and to said second image of the beam, before producing said disparity map, edge-search processing.

5. The method of claim 1, further comprising applying to said first image and to said second image of the beam, before producing said disparity map, line-search processing.

6. The method of claim 1, further comprising:

locating a first target position of the light beam starting from said light-beam source as a function of said geometric line that extends between said light-beam source and said first target position of the light beam, comparing said first target position of the light beam starting from said light-beam source with a second predetermined target position and detecting the offset between said first target position and said second target position, and adjusting the orientation of said light beam that propagates from said light-beam source as a function of the offset detected between said first target position and said second target position, wherein, in response to said adjustment, said light beam propagates from said light-beam source towards said second target position.

7. The method of claim 6, wherein said adjustment comprises an open-loop adjustment as a function of the offset detected between said first target position and said second target position.

8. The method of claim 6, wherein said second target position is user identifiable as one of:

a position propagation of said light beam from said light-beam source, or a target straight line to make said light beam parallel to.

9. The method of claim 1, applied to a lighting system comprising a plurality of light-beam sources that produce respective light beams, the method comprising selectively activating said sources in said plurality of light-beam sources during respective activation intervals, wherein, during the respective activation interval, one source in the plurality of light-beam sources is activated to produce a respective light beam while the other sources in the plurality of light-beam sources are deactivated, wherein the method comprises carrying out, during said respective activation interval for a respective light beam produced by the light-beam source activated in said respective activation interval, said steps of acquiring a first image and a second image of the beam, producing said disparity map of said first image and said second image of the beam, projecting said three-dimensional point cloud and clustering the points in said three-dimensional point cloud to produce a geometric line extending between the source in the plurality of light-beam sources activated to produce a respective light beam and said target position of the light beam.

10. A lighting system comprising:

at least one light-beam source configured to produce a light beam that propagates from said at least one light-beam source towards a target position of the light beam, and a computer-vision system equipped with a first camera and a second camera spaced apart from each other, wherein the computer-vision system is configured to perform steps of acquiring a first image and a second image of the beam, producing a disparity map of said first image and said second image of the beam, projecting a three-dimensional point cloud and clustering the points in said three-dimensional point cloud to produce a geometric line, applying a variation of orientation on said light-beam source, and identifying a first end of said geometric line between said light-beam source and said target position of the light beam subject to displacement in response to said variation of orientation and a second end of said geometric line between said light-beam source and said target position of the light beam exempt from displacement in response to said variation of orientation, wherein said first end and said second end identify, with respect to said geometric line, the location of said target position of the light beam and the location of said light-beam source, respectively.

11. A method comprising:

acquiring via a computer-vision system equipped with a first camera and a second camera spaced apart from each other, a first image and a second image of a light beam that propagates from a light-beam source towards a target position of the light beam, wherein the first image and the second image of the light beam differ from each other as a result of the first camera and the second camera being spaced apart from each other, producing a disparity map of said first image and said second image of the beam, projecting a three-dimensional point cloud starting from said disparity map of said first image and said second image of the beam, clustering the points in said three-dimensional point cloud to produce a geometric line that extends between said light-beam source and said target position of the light beam, locating a first target position of the light beam starting from said light-beam source as a function of said geometric line that extends between said light-beam source and said first target position of the light beam, comparing said first target position of the light beam starting from said light-beam source with a second predetermined target position and detecting the offset between said first target position and said second target position, and adjusting the orientation of said light beam that propagates from said light-beam source as a function of the offset detected between said first target position and said second target position, wherein, in response to said adjustment, said light beam propagates from said light-beam source towards said second target position.

12. The method of claim 11, wherein said adjustment comprises an open-loop adjustment as a function of the offset detected between said first target position and said second target position.

13. The method of claim 11, wherein said second target position is user identifiable as one of:
a position propagation of said light beam from said light-beam source, or
a target straight line to make said light beam parallel to.

14. A method applied to a lighting system comprising a plurality of light-beam sources that produce respective light beams, the method comprising selectively activating said sources in said plurality of light-beam sources during respective activation intervals, wherein, during the respective activation interval, one source in the plurality of light-beam sources is activated to produce a respective light beam while the other sources in the plurality of light-beam sources are deactivated, the method comprising:
acquiring via a computer-vision system equipped with a first camera and a second camera spaced apart from each other, a first image and a second image of a light beam that propagates from a light-beam source towards a target position of the light beam, wherein the first image and the second image of the light beam differ from each other as a result of the first camera and the second camera being spaced apart from each other,
producing a disparity map of said first image and said second image of the beam,
projecting a three-dimensional point cloud starting from said disparity map of said first image and said second image of the beam, and
clustering the points in said three-dimensional point cloud to produce a geometric line that extends between said light-beam source and said target position of the light beam, wherein the method comprises carrying out, during said respective activation interval for a respective light beam produced by the light-beam source activated in said respective activation interval, said steps of acquiring a first image and a second image of the beam, producing said disparity map of said first image and said second image of the beam, projecting said three-dimensional point cloud, and clustering the points in said three-dimensional point cloud to produce a geometric line extending between the source in the plurality of light-beam sources activated to produce a respective light beam and said target position of the light beam.

15. A lighting system comprising:
at least one light-beam source configured to produce a light beam that propagates from said at least one light-beam source towards a target position of the light beam, and
a computer-vision system equipped with a first camera and a second camera spaced apart from each other,
wherein the computer-vision system is configured to perform steps of acquiring a first image and a second image of the beam, producing a disparity map of said first image and said second image of the beam, projecting a three-dimensional point cloud, clustering the points in said three-dimensional point cloud to produce a geometric line, locating a first target position of the light beam starting from said light-beam source as a function of said geometric line that extends between said light-beam source and said first target position of the light beam, comparing said first target position of the light beam starting from said light-beam source with a second predetermined target position and detecting the offset between said first target position and said second target position, and adjusting the orientation of said light beam that propagates from said light-beam source as a function of the offset detected between said first target position and said second target position, wherein, in response to said adjustment, said light beam propagates from said light-beam source towards said second target position.

16. The lighting system of claim 15, wherein said adjustment comprises an open-loop adjustment as a function of the offset detected between said first target position and said second target position.

17. The lighting system of claim 15, wherein said second target position is user identifiable as one of:
a position propagation of said light beam from said light-beam source, or
a target straight line to make said light beam parallel to.

* * * * *